July 7, 1931.     B. E. LENEHAN     1,813,177
REMOTE METERING SYSTEM
Filed Jan. 18, 1929
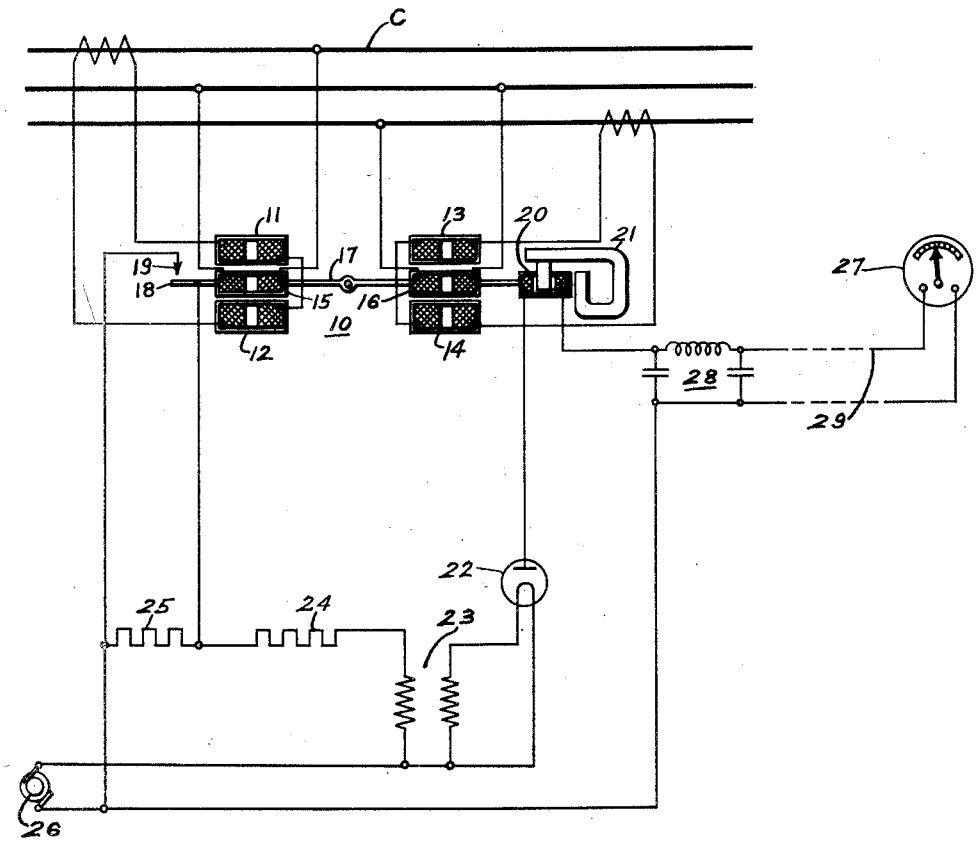
INVENTOR
Bernard E. Lenehan
BY
ATTORNEY Patented July 7, 1931

1,813,177

UNITED STATES PATENT OFFICE

BERNARD E. LENEHAN, OF BLOOMFIELD, NEW JERSEY, ASSIGNOR TO WESTINGHOUSE ELECTRIC & MANUFACTURING COMPANY, A CORPORATION OF PENNSYLVANIA

REMOTE-METERING SYSTEM

Application filed January 18, 1929. Serial No. 333,471.

This invention pertains to remote metering, and, in particular, to remote-metering systems for the transmission of indications of electrical measuring instruments to relatively distant points. My invention, however, has other uses which will be pointed out hereinafter.

The principal object of my invention is to improve upon systems of the type mentioned which have been known and used heretofore.

Another object of my invention is to provide a remote-metering system embodying a minimum of auxiliary apparatus.

A further object of my invention is to produce a remote-metering system which can be cheaply manufactured and, at the same time, be relied upon in practice.

Other objects of this invention will appear more fully and at large in the following description thereof.

In accordance with my invention, I propose to employ an electron-discharge device, the thermal element of which has a relatively long time lag, in connection with a Kelvin balance or other equivalent electrical measuring instrument, to control the magnitude of a circulating current which is utilized to actuate a meter at a distant point to indicate the magnitude of the quantity or characteristic under measurement.

The system of my invention will be more fully understood by a consideration of this specification in connection with the accompanying drawing which is a diagrammatic illustration of one embodiment of my invention.

Referring, in detail, to the drawing, the remote-metering system of my invention includes a Kelvin balance 10 having fixed coils 11, 12, 13 and 14 and movable coils 15 and 16 disposed at opposite ends of a pivoted beam 17. The coils of the balance may be so connected, in the usual manner, as to be affected by the voltage, current, power, or any other electrical quantity, function or characteristic of a circuit, such as that shown at C.

One end 18 of the pivoted beam 17 is adapted to engage a fixed contact 19, although any other suitable arrangement of the contact members 18 and 19 may be employed. The other end of the beam 17 carries restoring or compensating coil 20 which is adapted to cooperate with a magnet 21.

An electron-discharge device 22, preferably of the alternating-current type, embodies an indirectly heated cathode, which is adapted to be energized by current from a transformer 23. The transformer 23 is connected, in series with resistors 24 and 25, to a source of current, such as the generator 26. The resistor 25 is adapted to be shunted when the end 18 of the beam 17 engages the fixed contact 19. The purpose of the resistors 24 and 25 is to limit the current supplied to the thermal element of the device 22 under normal conditions. When the resistor 25 is shunted, an increased current is supplied to the device 22. When the resistor 25 is not shunted but is in circuit, sufficient current will be supplied to the heater to maintain the cathode of the device 22 at a temperature just below that at which it emits electrons.

The anode-cathode circuit of the device 22 includes the restoring or compensating coil 20 of the balance 10, a meter 27 of any standard type and a suitable source of direct or alternating current such for example as the generator 26. A filter 28 is employed to smooth out the variations in the current traversing the transmission circuit 29 that connects the meter 27 and the device 22. It is apparent that any control, indicating, or integrating device may be substituted for the meter 27.

The operation of the system shown is similar to that of other remote-metering systems of this type which have been known heretofore, but a brief description thereof is here included.

The remote-metering system of my invention will be so designed and adjusted that, when no power is being consumed in the circuit C, the beam 17 of the balance 10 will be maintained out of engagement with the fixed contact 19.

When a load is connected to the circuit C, the beam 17 of the balance 10 will be actuated into engagement with the contact 19, as a result of the energization of the windings of the balance. The resistor 25, being shunted by the engagement of contacts 18 and 19, the energization of the transformer 23 and the heater of the device 22 will be increased. As a result, an increasing current traverses the restoring coil 20 and the meter 27. The restoring coil 20 tends to cause the separation of the contacts 18 and 19. At the same time, the reading of the meter 27 increases.

When the energization of the restoring coil 20 has increased sufficiently, the contacts 18 and 19 will be separated, and the resistor 25 will again be inserted in the circuit of the transformer 23. The current in the restoring coil and the meter will slowly be reduced and, if the load remains on the circuit C, the energization of the coils of the balance 10 will again cause the engagement of the contacts 18 and 19, with the same result as before.

It will be apparent from the foregoing that, so long as a load is connected to the circuit C, the contacts 18 and 19 will alternately be engaged and separated, and that the relative intervals of engagement and separation will vary, depending upon the magnitude of the load on the circuit C, the interval of engagement increasing with the load. The intermittent increases in the energization of the transformer 23 and the heater of the device 22 will tend to produce a series of current variations in the circuit which includes the restoring coil and the meter 27. Because of the considerable time lag in the operation of the device 22, however, the current traversing the restoring coil 20 and the meter 27 is maintained substantially constant so that a steady indication will be obtained at the meter 27.

As hereinbefore stated, the current source for the device 22 may be an alternating-current or direct-current source. If alternating current is used, it is necessary to provide means for preventing the 60-cycle hum which is characteristic of the usual alternating-current source, from affecting telephone apparatus connected to the circuit 29. For this purpose, the filter 28 is employed. The effect of the filter is to smooth out the rectifier output of the device 22 to produce a steady current in the meter circuit instead of the series of half-cycles of current which is derived from the device 22. The manner in which the device 22 serves as a rectifier is characteristic of all thermionic devices and, therefore, is not described in further detail.

When direct current is employed, the source may be located at either end of the circuit 29, and the filter 28 becomes unnecessary. In this case, the lower conductor of the circuit 29 is connected to the cathode of the device 22 to complete the anode-cathode circuit, instead of to the alternating-current source as shown.

Since the system of my invention has numerous applications, and since changes and alterations therein will probably occur to those skilled in the art, it is not my intention to be limited to the exact embodiment of my invention shown and described herein except as necessitated by the scope of the appended claims.

I claim as my invention:

1. A metering system including a meter, a control device responsive to the quantity or characteristic to be measured, a thermionic device having a considerable time lag, a contact member actuated intermittently into engagement with a fixed contact member by said control device in such manner that the interval of engagement of said contact member is a function of the magnitude of said quantity or characteristic, for controlling the energization of said thermionic device, said meter being responsive to the magnitude of the current passing through said thermionic device.

2. In a metering system, in combination, an electric circuit, a Kelvin balance connected to the circuit disposed to respond to a predetermined characteristic of said circuit, said balance being provided with contact members and a direct-current counter-torque-producing element, a source of current, a resistor, a thermionic discharge device having a thermal element and an anode, said thermal element being connected to the source of current in series with the resistor, said contact members being disposed to shunt the resistor, an indicating meter, and means for connecting the anode and the counter-torque-producing element in series-circuit relation with the meter to the source of current, whereby the Kelvin-balance is caused to intermittently close its contact members to cause said thermionic-discharge device to vary the current in the meter circuit.

3. In a metering system, in combination, a meter, an electric circuit, control means operable in response to the power absorbed by the circuit, said means being provided with circuit-controlling contact members and a counter-torque-producing element, an electron-discharge device having a thermal element and an anode, a separate source of current for energizing the thermal element, a resistor for varying the energization of the thermal element, said circuit-controlling contact members being disposed to control the effectiveness of the resistor, and means for connecting the meter and the counter-torque-producing element in series with the anode to the separate source of power to effect the operation of the meter in accordance with the amount of power absorbed by the electric circuit.

4. In a metering system for indicating a characteristic of an electric circuit, in combination, a meter, a Kelvin-balance provided with contact members responsive to the magnitude of the circuit characteristic, a restoring coil disposed to restore the Kelvin-balance after said balance has been actuated in response to the circuit characteristic, a thermionic device for controlling the current for actuating the meter, means for energizing said thermionic device, means for rendering the Kelvin-balance effective to control the energization of the thermionic device through the operation of its contact members, and means for energizing the restoring coil on the Kelvin-balance and the meter in accordance with the output of the thermionic device, whereby the Kelvin-balance is caused to actuate its contact members into engagement for periods of time depending upon the value of the circuit characteristic being indicated.

5. A system for operating an indicating device comprising a controlling device responsive to the magnitude of a quantity or characteristic to be indicated, a thermionic device disposed to control the indicating device, and means actuated by said controlling device in accordance with the magnitude of said quantity or characteristic for varying the degree of energization of the thermionic device, said indicating device being also responsive to the degree of energization of the thermionic device.

6. An indicating system including a Kelvin-balance responsive to a quantity to be indicated, a thermionic device having a cathode element with a relatively high thermal capacity and an anode element, an alternating-current source for energizing the cathode and anode circuits of the thermionic device, said device being operative to rectify the alternating current, an indicating device responsive to the rectified current, and means whereby the magnitude of the rectified current is varied in accordance with the operation of the Kelvin-balance.

7. A metering system comprising a meter, a control device responsive to the quantity to be measured, said control device being provided with contact members, means for causing said control device to be actuated in response to the existence of the quantity to be measured to cause the interval of engagement between the contact members to be a function of the magnitude of the quantity, a thermionic device having a predetermined time lag in its operation, means for energizing said device, said contact members being disposed to vary the energization of the thermionic device in accordance with the interval of their engagement, and means for rendering the meter responsive to the magnitude of the current passing through the thermionic device.

8. In a metering system, in combination, an electric circuit, a remotely disposed indicating device, a Kelvin balance responsive to the quantity of the circuit characteristic to be indicated, said balance being provided with contact members disposed to be actuated into engagement when the balance is energized and a counter-torque-producing element effective, when energized, to cause the contact members to be disengaged, means for connecting the indicating device and the counter-torque-producing element in series-circuit relation, a source of current supply for energizing said series circuit, an electron-discharge device for controlling the current in the series circuit, and means controlled by the alternate engagement and disengagement of the contact members of the Kelvin balance for controlling the emission of the electron-discharge device, whereby the amount of current flowing in the indicating device is dependent upon the relative time intervals of engagement and disengagement of the contact members.

9. In a metering system, in combination, an electric circuit, a Kelvin-balance element connected to the circuit, said Kelvin-balance element being provided with contact members and a direct-current balancing element, a metering device, an energizing circuit for the metering device including the direct-current balancing element, a thermionic device having a thermal element and an anode connected in said energizing circuit for controlling the flow of energizing current, and means including the contact members of the Kelvin-balance element for intermittently changing the energization of the thermal element of the thermionic device thereby to effect variations in the flow of current in the energizing circuit for the metering device in accordance with the magnitude of the load on the electric circuit.

In testimony whereof, I have hereunto subscribed my name this 9th day of January, 1929.

BERNARD E. LENEHAN.